Feb. 26, 1974  C. E. CHRISTIE ET AL  3,794,538
METHOD FOR MAKING A ROLLING LOBE DIAPHRAGM
Original Filed July 13, 1970  9 Sheets-Sheet 4

United States Patent Office 3,794,538
Patented Feb. 26, 1974

3,794,538
METHOD OF MAKING A ROLLING LOBE DIAPHRAGM

Christopher E. Christie, James R. Fedor, and Ishmael S. Harwell, Akron, and Robert S. Riggs, Stow, Ohio, assignors to The Goodyear Tire & Rubber Company, Akron, Ohio
Original application July 13, 1970, Ser. No. 54,420, now Patent No. 3,666,598. Divided and this application Mar. 3, 1972, Ser. No. 231,707
Int. Cl. B65c 3/12; B65h 11/02
U.S. Cl. 156—187                                    7 Claims

ABSTRACT OF THE DISCLOSURE

A method of fabricating a cord reinforced sleeve comprising mounting a tube of uncured curable rubbery material on a rigid cylindrical mandrel, placing a band of precut cord material upon a carrier in the form of an endless movable belt so that the cords of such band are oriented parallel to a line which makes an acute angle with the longitudinal axis of the mandrel so that relative movement between the band on the carrier and the tube on the mandrel in a direction circumferentially of the mandrel wind the band helically about the mandrel a plurality of times and place the respective edges of the band in mutually adhesive contact along a helix coaxial with the tube on the mandrel.

---

This is a division of application Ser. No. 54,420, filed July 13, 1970, now U.S. Pat. No. 3,666,598.

The present invention relates to methods of and apparatus for manufacturing rolling lobe diaphragms, sometimes referred to as air springs, and particularly such diaphragms of the type useful in automotive vehicle shock absorbers.

The invention aims particularly to improve the ease, speed and accuracy of manufacture of such rolling lobe diaphragms for shock absorbers. A principal object of the invention is the provision of a method for fabricating an eversible elastomeric tubular diaphragm or sleeve having cord reinforcing elements disposed in two respectively superimposed helices of opposite hands and at least one seamless tubular layer of rubbery material united coaxially with said reinforcing cord elements.

A further object is an apparatus capable of fabricating an eversible sleeve or diaphragm by winding a plurality of bands of cords and a covering liner successively about a seamless tube of curable rubbery material with the respective edges of each band in mutually adhering contact along respectively opposite helices extending a plurality of turns about the tube by a continuous single movement of a belt operable to rotate the tube while the same is held on a curing mandrel.

The foregoing objects and advantages, together with additional objects and advantages which will become apparent or be particularly pointed out in the subsequent description herein of particular embodiments of the invention, are accomplished by the provision of a process comprising applying at least one seamless tube of elastomeric uncured curable rubbery material coaxially and snugly about a curing mandrel, providing at least one length of a band of cord elements, said length having the form of a parallelogram, disposing such band on a surface parallel to said mandrel such that each cord element extends parallel to a line making a predetermined acute angle with the rotational axis of said mandrel while the respective cut ends of said length terminate in axially spaced planes perpendicular to said axis, relatively moving the so cut band and surface and said tube tangently to effect rotation of the mandrel and concurrently winding the band of cord elements about the tube with the respective longitudinal edges of said band in mutually adherent contact helically about said tube, winding a covering liner of elastomeric uncured curable material about the band on the mandrel, curing the resulting sleeve on said mandrel and then stripping the so cured sleeve from the mandrel.

In accordance with a further aspect of the invention, an apparatus is provided for the practice of the foregoing process which apparatus includes a plurality of curing mandrels, means for releasably mounting each of said mandrels successively for rotation about its own axis, belt means effective to rotate said mandrel to wrap a band of cord material therearound, belt drive means operable to move said belt means intermittently to rotate each said mandrel a predetermined number of revolutions, means for measuring a predetermined length of said cord band, means for cutting off such measured length, means for transferring said measured length to said belt means, means for moving said mandrels successively into coaxial relation with said means for mounting each mandrel and means for removing each said mandrel with a completed sleeve thereon from such mounting means to receiving means from which said mandrel with the sleeve thereon can be transferred to a subsequent curing operation.

Both the uncured curable rubbery material and cord reinforcing elements and bands thereof, as well as the rolling lobe diaphragm or sleeve, are of known compositions readily available to persons skilled in the relevant arts. Such materials, elements and bands, not being within the scope of the present invention, are not further described in the present specification.

In the following description of particular embodiments of the invention which are set forth by way of illustration and not limitation of the invention, reference is made to the drawings annexed hereto in which.

The method according to the present invention is best illustrated by reference to FIGS. 1–5. A generally cylindrical tube of an indefinite running length of an uncured curable rubbery material is extruded by conventional means (not shown) and is cut to form a plurality of predetermined lengths of such tube. Two such lengths T are radially expanded slightly and are slipped coaxially over a thin-walled curing mandrel 30 of rigid cylindrical form which has been treated (in a known manner) to prevent adherence of the rubbery material thereto, each to abut a ring or collar 32 permanently secured to the mandrel 30 at the middle of its axial length, and relaxed to fit snugly about and along the mandrel axially outwardly from the ring. The slight expansion sufficient to facilitate moving the tube axially on to the mandrel is accomplished by blowing air between the tube and mandrel.

From a running length supply of cord band stock a predetermined suitable length is cut to form a parallelogram L which is then disposed on a surface 35 tangent to the surfaces of the tubes T with the cords and the long edges of the parallelogram L oriented parallel to a line which makes an angle of 36 degrees with the axis 40 of the tubes and the mandrel 30. From a second such supply of cord band stock a second parallelogram L' having like dimensions is cut and disposed on the surface 35 at an equal but opposite angle with respect to the mandrel axis and beyond the first parallelogram L from the mandrel. A rectangular sheet C of uncured curable rubbery material, which can be of the same composition as the material of the tubes T, is placed on the surface 35 with its longer sides parallel to the mandrel 30 and spaced therefrom beyond both parallelograms L, L' and with its shorter sides parallel to and respectively outward of the shorter edges of the paralellograms.

The surface 35 is then moved relative to the mandrel 30, which is mounted for rotation about its own longitudinal axis, so as to cause rotation of the mandrel during which rotation the cords of the first parallelogram L are wrapped helically about the tubes causing the respective longer edges a, b to be brought into mutually adherent contact in a first helix h thereabout. The second parallelogram L' is then similarly wrapped about the parallelogram L so that the edges a', b' of the latter adhere to each other and form a second helic h' of opposite hand. Each helix extends about four turns about the axis 40. The covering liner sheet C is then, by the continuing movement of the surface 35, wrapped circumferentially about the previously applied cord band parallelograms L, L' to encase the cords thereof in uncured curable rubbery material. The surface 35 continues its motion after the sheet C has been completely wound about the mandrel effecting continuing rotation of the mandrel during which rotation portions W of the so formed sleeve disposed axially outwardly of the cord endings are cut circumferentially for subsequent removal of the said portions from the mandrel. It will be appreciated that the angles between the respective cord bands and the mandrel can be selected as may be required by the sleeve or diaphragm to be made and that the 36 degrees stated herein is by way of illustration only rather than as limiting the invention hereof.

The mandrel 30 with the assembled sleeve thereon is then transported to a curing apparatus (not shown) of known construction in which the tube is cured in place on the mandrel. Following such cure, the cured sleeve is stripped from the mandrel, then being cut into two halves at the annular groove formed therewithin by the abutment ring 32. The sleeves or diaphragms are then at least partially eversed or turned inside out for assembly each in an automotive shock absorber, wherein the tubular surface of the diaphragm which has been cured in direct contact with the mandrel becomes the surface exposed to the operating fluid pressure of the shock absorber as well as the surface undergoing compressive stress due to the rolling action of the lobe formed by the diaphragm or sleeve during its use.

Each mandrel 30, is a thin-walled cylindrical tube of metal, light in weight, for ease of handling and for effective heat transfer to facilitate curing of the sleeves built thereon. Aluminum tubing has been found suitable. The exterior surface can be plain or have therein a negative replica of a pattern, such as of circumferential grooves and ridges, desired in the molded surface of the cured sleeve.

In accordance with a further aspect of the invention, an apparatus 50 is provided for carrying out the method hereinbefore described.

BELT PORTION

Figure 6:
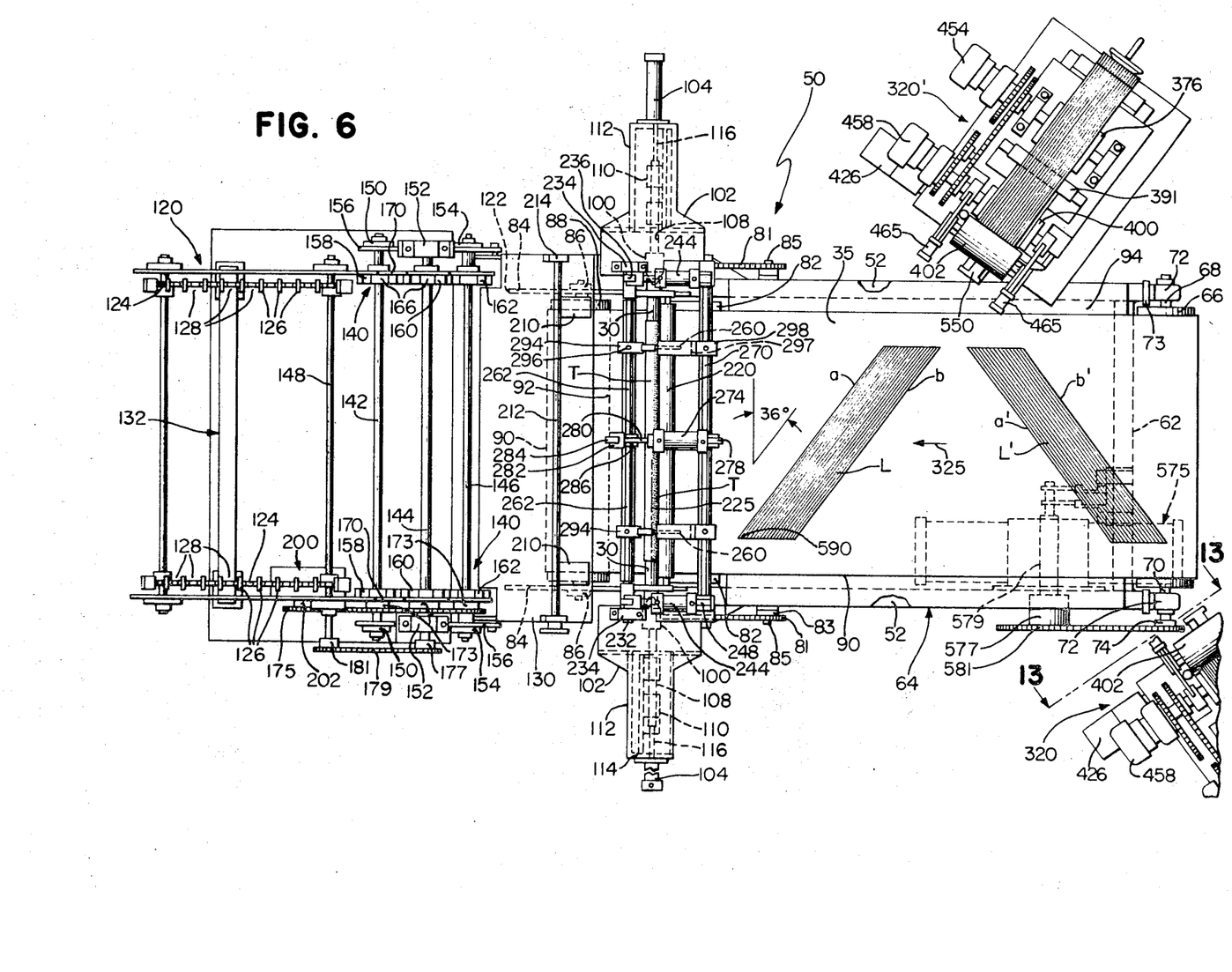
FIGS. 6 and 7 are, respectively, a plan and an elevation view of apparatus in accordance with the invention.
Figure 7:
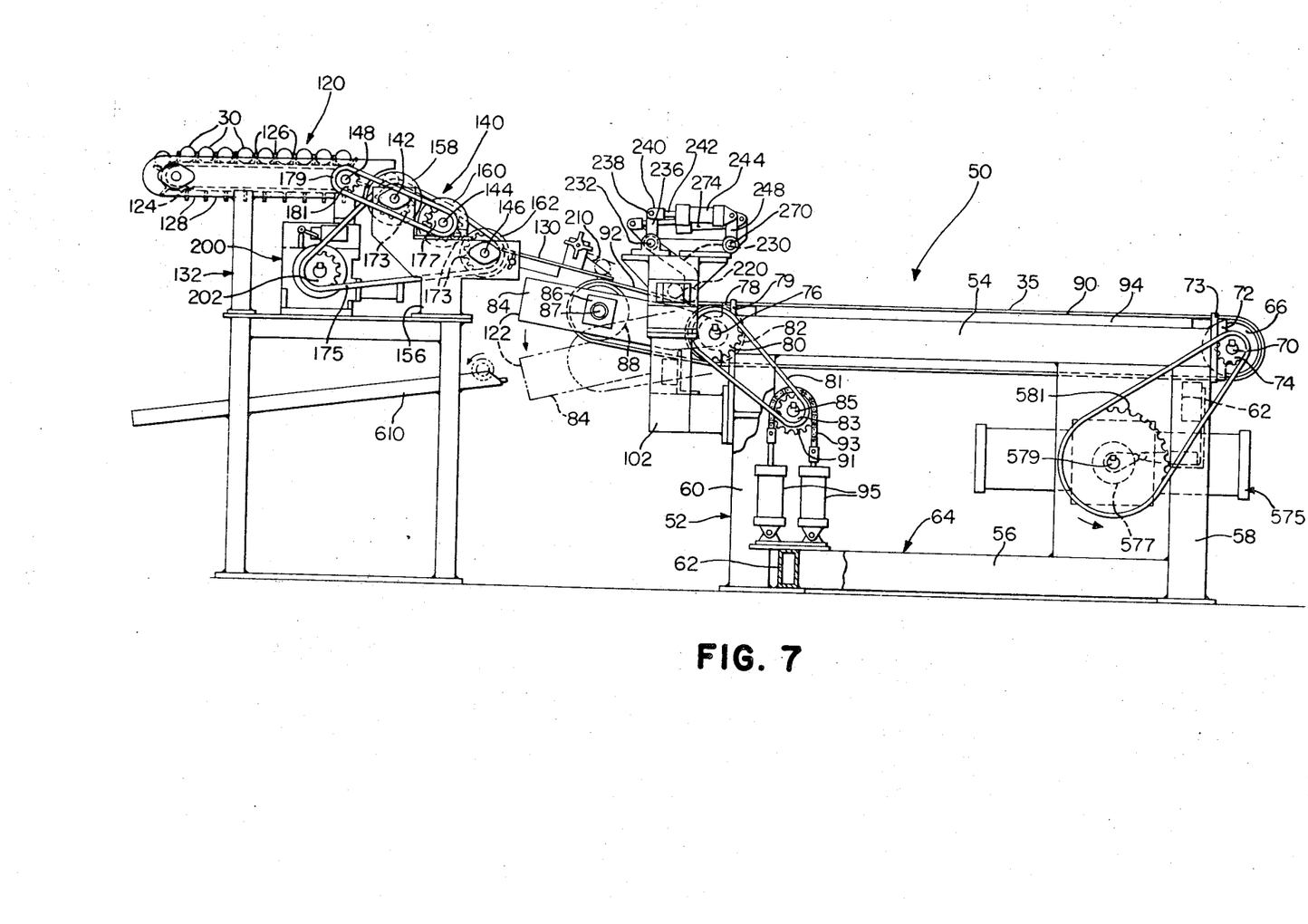

Referring to the drawings and particularly to FIGS. 6 and 7; the preferred apparatus 50 includes a pair of side frames 52 each including upper and lower horizontal beams 54, 56 and vertical posts 58, 60 joined in a rectangular array, the side frames being interconnected by crossbeams 62 to form a stiff welded base 64. A belt drive roll 66 having journals 68, 70 is rotatably supported in suitable bearings 72 mounted at the end 73 of the respective upper beams 54. The journal 70 is extended axially outward of the adjacent bearing 72 to carry a sprocket 74 corotatably keyed thereon. A swing arm shaft 76 parallel to the drive roll is journalled rotatably in suitable bearings 78 fixed at the ends 79 of the respective upper beams 54 and has a pair of sprockets 80 corotatably keyed at the respective ends thereof immediately outwardly of the side frames 52. An intermediate idler roll 82 is mounted rotatably on bearings carried by the shaft 76. A pair of arms 84 are corotatably secured on the shaft 76 immediately inwardly of the respective side frames 52 to extend longitudinally outwardly parallel to each other and to the frames 52. Conventional slide take-up bearings 86 mounted respectively on the swing arms 84 carry the respective journals 87 of the belt swing roll 88 for rotation about an axis parallel to the drive roll 66 and for movement of the roll 88 up or down arcuately about the shaft 76. To swing the arms 84 about the shaft 76, the sprockets 80 are rotated by the chains 81 from the sprockets 83 fixed on the cross shaft 85 which is rotatable in bearings fixed on the posts 60. The sprocket 91, corotatable with the cross shaft 85, is connected by the chain 93 to each of two air cylinders 95 which are fixed upon the crossbeam 62 between the side frames 52.

The plane or surface 35 is provided by a broad endless belt 90 trained about the drive roll 66 and the swing roll 88, the intermediate roll 82 being within the loop of the belt, to provide a generally horizontal upper reach extending between the drive roll 66 and the intermediate roll 82 and an inclinable reach 92 extending between the intermediate roll 82 and the swing roll 88. The horizontal reach is also supported by the flat horizontal plate 94 bridging the space between the side frames 52 and between the rolls 66 and 82.

MANDREL CHUCKING

In order to receive and support the previously described mandrel 30 for rotation about its own longitudinal axis 40, a freely rotatable mandrel chuck 100 is carried by each of the structures 102 secured respectively to the posts 60. The chucks 100 are coaxially aligned and are movable coaxially toward and away from each other to engage a mandrel therebetween and to release such mandrel by operation of the air cylinders 104.

Figure 8:
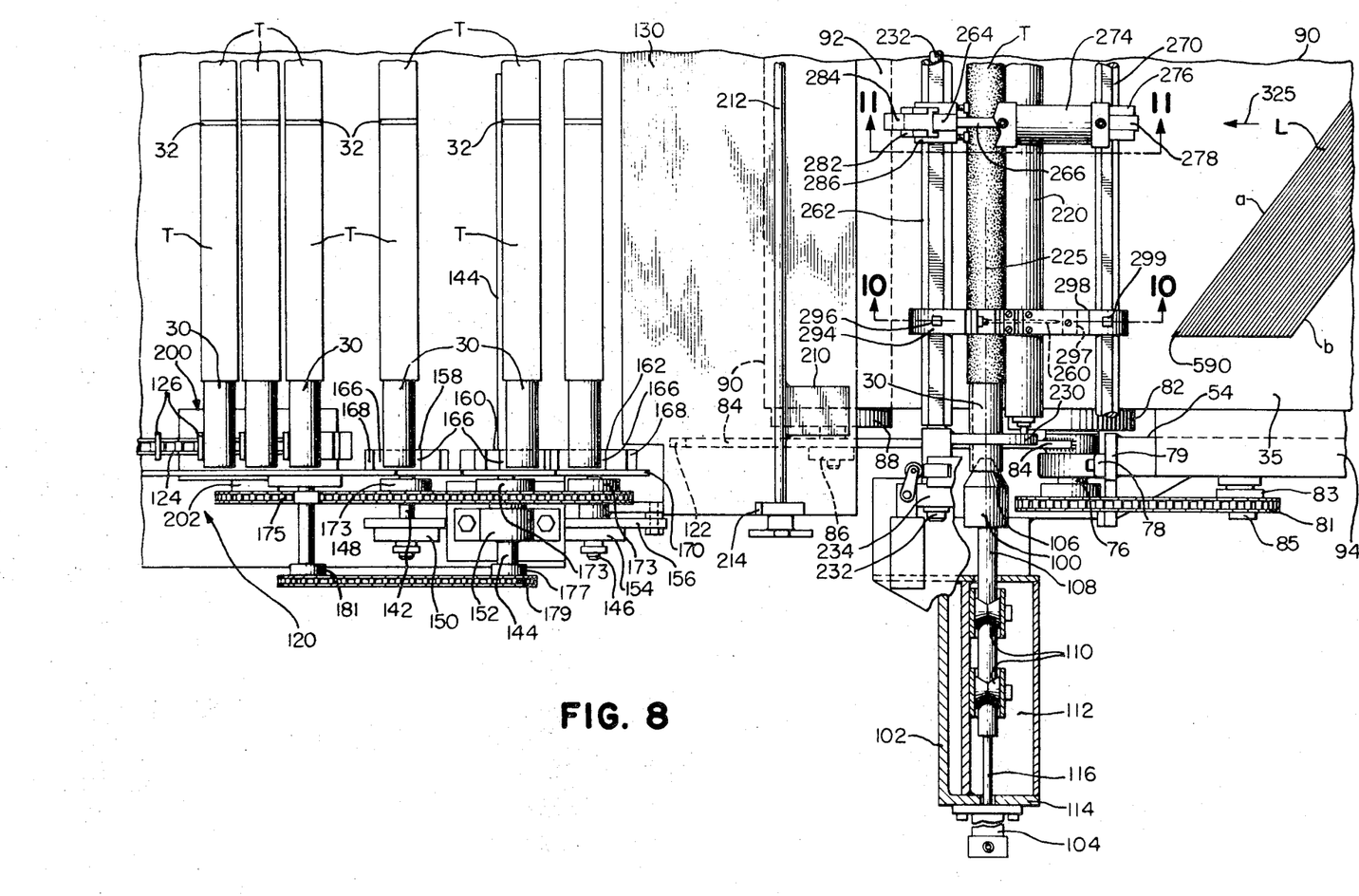
FIGS. 8 and 9 are, respectively, enlarged portions of the views of FIGS. 6 and 7.
Figure 9:
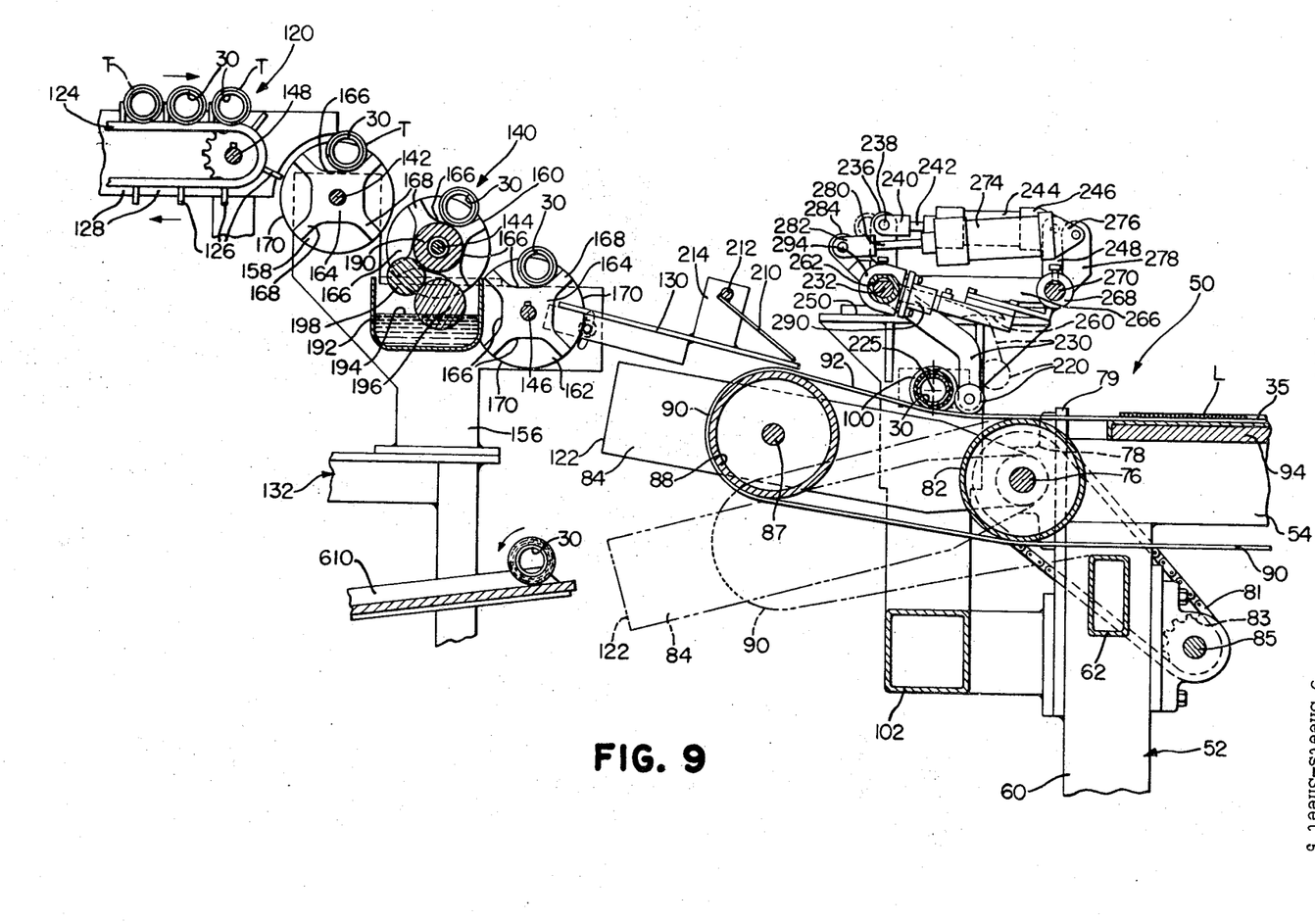

As may best be seen in FIGS. 8 and 9, each chuck 100 is provided with a cone 106 adapted to enter the end of tubular mandrel 30 coaxially to center and to support the same for rotation. Each chuck is mounted rotatably on a non-rotating spindle 108 which is longitudinally reciprocable in the rolling element bearings 110 fixed in a bearing housing 112 formed in each respective structure 102. Each air cylinder 104 is secured to the outer wall 114 of the respective bearing housing, its piston rod 116 being extended through the wall and secured coaxially to the respectively associated spindle 108. Other means for receiving and supporting the mandrels and for releasing them will be readily perceived.

MANDREL HANDLING PORTION

In order to deliver a succession of the mandrels 30 one at a time to the chucks 100, as well as to prevent the elastomeric tubes T thereon from adherent contact with one another, a mandrel delivery mechanism 120 is disposed adjacently to and outwardly of free ends 122 of the swing arms 84. The mechanism 120 comprises a spaced pair of substantially conventional conveyor loops 124 of link chain having elements 126 attached to the respective links to provide successive opposed pairs of separating pockets 128 for the respective ends of the mandrels 30 which can be loaded thereto by hand or by mechanical means not shown.

In order to transfer prepared mandrels from the conveyor loops 124 to the apron 130 attached to the frame 132 of the mechanism 120, a star-wheel transfer device 140 is disposed between the respectively adjacent ends of the conveyor loops 124 and the apron 130. The device 140 comprises three mutually parallel shafts 142, 144, 146 disposed parallel to and at respective decrements of elevation below the sprocket shaft 148 of the chain conveyor loops. Each shaft is rotatably supported, respectively, in pairs of bearings 150, 152, 154 fixed, respectively, on the upright side members 156 which form a part of the frame 132. Each shaft 142, 144, 146 has a pair of star-wheels 158, 160, 162 corotatably attached thereon inboard of the respective bearing. Each star-wheel comprises a hub 164 having four equally spaced radial pockets 166 defined by radial vanes 168 extending from the hub and joined integrally to a radially extending annular flange 170 formed on the hub, the flanges being aligned respectively in common planes perpendicular to the shafts 142–148, the flanges being spaced to locate successive mandrels longitudinally therebetween while the mandrel rests within a corresponding pair of pockets 166 of the star-wheels. A roller chain sprocket 173 is corotatably affixed at the rear end of each of the shafts 142, 144, 146 immediately inwardly of the respective bearings 150, 152, 154, the sprockets 173 being engaged with a loop of roller chain 175 to provide positive correlation of rotational advance of each pair of star-wheels. A sprocket 177 mounted on an outward extension of the intermediate shaft 144 is drivingly connected by a chain 179 to a sprocket 181 mounted on an outward extension of the conveyor drive shaft 148 to provide positive rotational correlation between the conveyor chain loops 124 and the transfer device 140.

Referring in particular to FIG. 9, the transfer device 140 may alternatively include means for applying, to the elastomeric tubes on each mandrel, a wash of solvent or the like, for example, to promote adhesion thereto of the band or bands of cord reinforcing stock to be wound thereon. In such alternative, a wash roll 190 is mounted coaxially and relatively rotatably on the shaft 144. The solvent or like is supplied to a pan or fountain 192 in which a level 194 of suitable solvent, such as benzene, is maintained to partially immerse a dip roll 196 from which the solvent is transferred to a gate roll 198 and thence to the wash roll 190 and to the outer surfaces of the respective tubes T. The dip roll 196 and the gate roll 198 may be mounted on suitable bearings (not shown) fixed with respect to the end walls (not shown) of the pan 192 and either or both rolls will be connected to drive means for effecting rotation thereof to rotate the wash roll 190 and the mandrel 30. Measures suitable for coping with the known risks of fire or explosion must be afforded if this alternative is to be employed.

In order to index the star-wheel feed device 140 and conveyor loops 124, rotating each pair of star-wheels through approximately 90 degrees, an indexing drive 200 fixed on the frame 132 has a sprocket 202 on its output shaft 175. The drive 200 is operable to rotate the sprocket 202 through a part of one revolution so that each movement of the drive advances one mandrel 30 to the apron 130 from the pair of star-wheels 162 which, as may be seen in FIG. 9, receives a succeeding mandrel from the intermediate pair of star-wheels 160, which in turn receives a mandrel from the first pair of star-wheels 158, which in turn receives a mandrel from the respectively associated chain conveyor pocket. In the present apparatus, the drive 200 is an Allen-Air-Dial Feed Table, a well known commercially available unit.

To control the movement of a mandrel 30 along the apron 130, a pair of spring fingers 210 engage the free rolling mandrel on the apron to slow its movement as the same approaches the end of the aprong and the belt 90. The fingers 210 are affixed on a cross-rod 212 supported by brackets 214 secured to the respective lateral edges of the apron 130.

In order to locate each mandrel 30, and the upwardly inclined portion 92 of the belt, an arresting roll 220 is positioned to depress the inclined portion of the belt and spaced radially from the axis 225 of the mandrel chucks 100 by an amount generally equal to the radius of the tubes T on the mandrel such that the mandrel is arrested and located in coaxial alignment with the mandrel chucks. The roll 220 is mounted rotatably in the respective free ends of a laterally spaced pair of arms 230 each of which is secured corotatably on and adjacent the respective ends of a cross shaft 232 mounted rotatably in suitable pillow block bearings 234 fixed on the upper surfaces 250 of the structures 102. Rotation of the shaft 232 to effect movement of the arresting roll 220 radially toward or away from the axis 225 is provided by crank arms 236 affixed corotatably on the shaft 232 at the respectively associated arms 230. The radially outer ends of the crank arms 236 are connected by pins 238 to clevises 240 attached to piston rods 242 of the air cylinders 244, the head ends 246 of which are pin connected to brackets 248 rigidly secured to the upper surface 250 of the structure 102 so that operation of the air cylinders 244 serves to rotate the shaft 232 and thereby swing the roll 220 toward and away from the chuck axis 225.

SLEEVE TRIMMING PORTION

Figure 10:
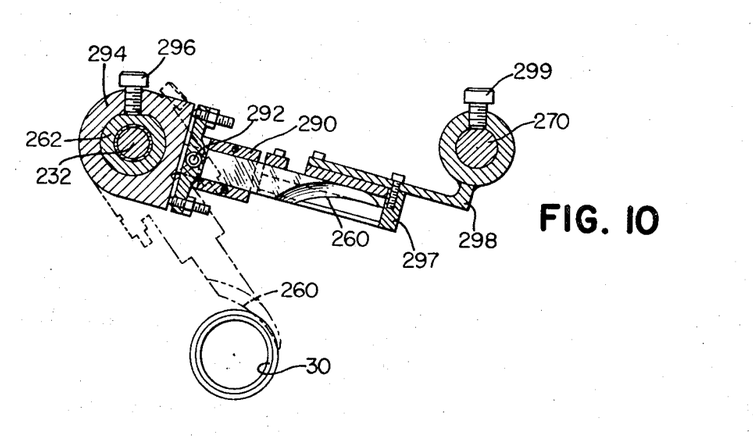
FIGS. 10, 11, and 12 are views of respective portions of the apparatus of FIGS. 6 and 7 taken as indicated by the lines 10—10 in FIG. 8, 11—11 in FIG. 8, and 12—12 in FIG. 11, respectively.
Figure 11:
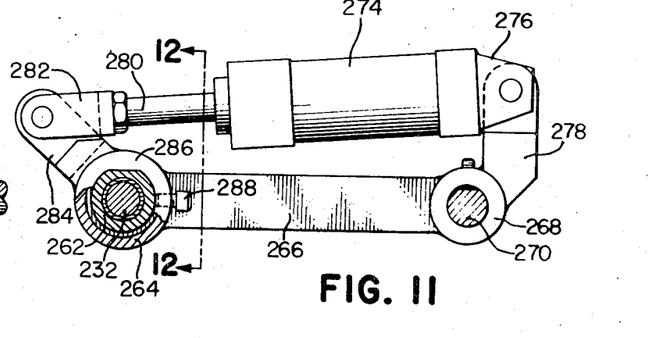
Figure 12:
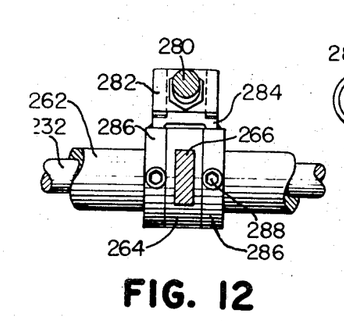

In order to mount a pair of trimming knives 260, the use of which will be clarified presently herein, a rigid cylindrical tube 262 is coaxially mounted for rotation about the shaft 232. Referring additionally to FIGS. 10, 11, and 12; the tube 262 is rotatable within a collar 264 forming one end of a stiffening member 266 of which the opposite end forms a collar 268 which is adjustably fixed to a support bar 270, the respective ends of which are secured in bosses 272 formed in the brackets 248. The tube 262 is caused to rotate to actuate the knives 260 by an air cylinder 274 the head end 276 of which is pin-connected to a bracket 278 secured to the collar 268 and the rod end 280 of which is connected by a clevis 282 to an arm 284 having a pair of collars 286 corotatably secured to the tube by the set screws 288, the collars being juxtaposed one on each side of the collar 264.

In order to trim the ends W of the sleeve assembled on the mandrel while the same is rotated, the knives 260 are fixed respectively in the knife holders 290 which are pivotally adjustable about the pins 292 fixed respectively in the sliders 294 which are themselves laterally adjustable along the length of the tube 262 toward and away from the operating cylinder 274 and the machine centerline. Each slider 294 is provided with a suitable clamp screw 296 for appropriate adjustment thereof.

Each of the trimming knives is movable by rotation of the tube 262 between a cutting position wherein the knife 260 cut radially through the sleeve on the mandrel 30, while the same continues to be rotated by the belt 90, and a retracted position wherein the knife 260 itself is disposed within a knife heater 297 mounted on a bracket 298 which is adjustably fixed in a lateral position along the bar 270 corresponding to the lateral position of the respective knife and there held by a clamp screw 299.

BAND LAYING PORTION

In accordance with a further aspect of the invention, the apparatus included particularly a mechanism 320 adapted to place on the belt 90, as has hereinbefore been indicated, a prepared band of parallel cords extending parallel to a line making an angle of 36 degrees with the chuck axis 225. The prepared band is cut to a suitable length and forms the elongated parallelogram L, the long sides of which are referred to herein as edges *a* and *b* and extend parallel to the cords. The short sides of the parallelogram L lie, when disposed on the surface 35, in planes perpendicular to the chuck axis 225 and are of such length as to equal or slightly exceed the circumference of the uncured curable tube T on the mandrel.

Figure 13:
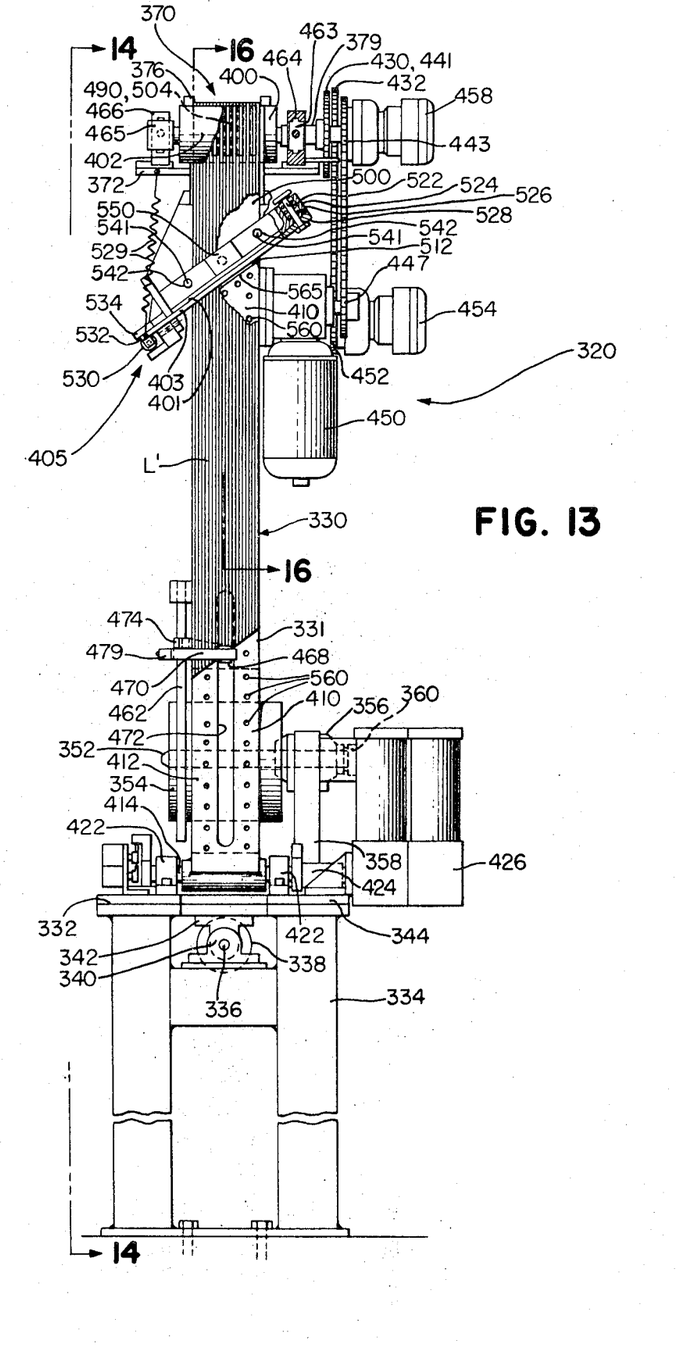
FIGS. 13 and 14 are, respectively, front and side elevation views of parts of the apparatus of FIG. 6, oriented as shown by the lines 13—13 in FIG. 6, and 14—14 in FIG. 13, respectively.

Referring particularly to FIGS. 6 and 13; the apparatus includes specifically two mechanisms 320, 320' for disposing prepared bands of cords upon the belt 90. Each mechanisms is oriented and spaced laterally and longitundially relative to the direction of movement of the belt designated by the arrow 325 so that the respective bands are placed at equal and opposite angles relative to the mandrel 30 and to the direction 325. The respective mechanisms 320 and 320' are identical in all significant respects but are erected opposite in hand as may be seen in FIG. 6. Description of the mechanism 320, therefore, will suffice to provide a clear understanding of both.

Figure 14:
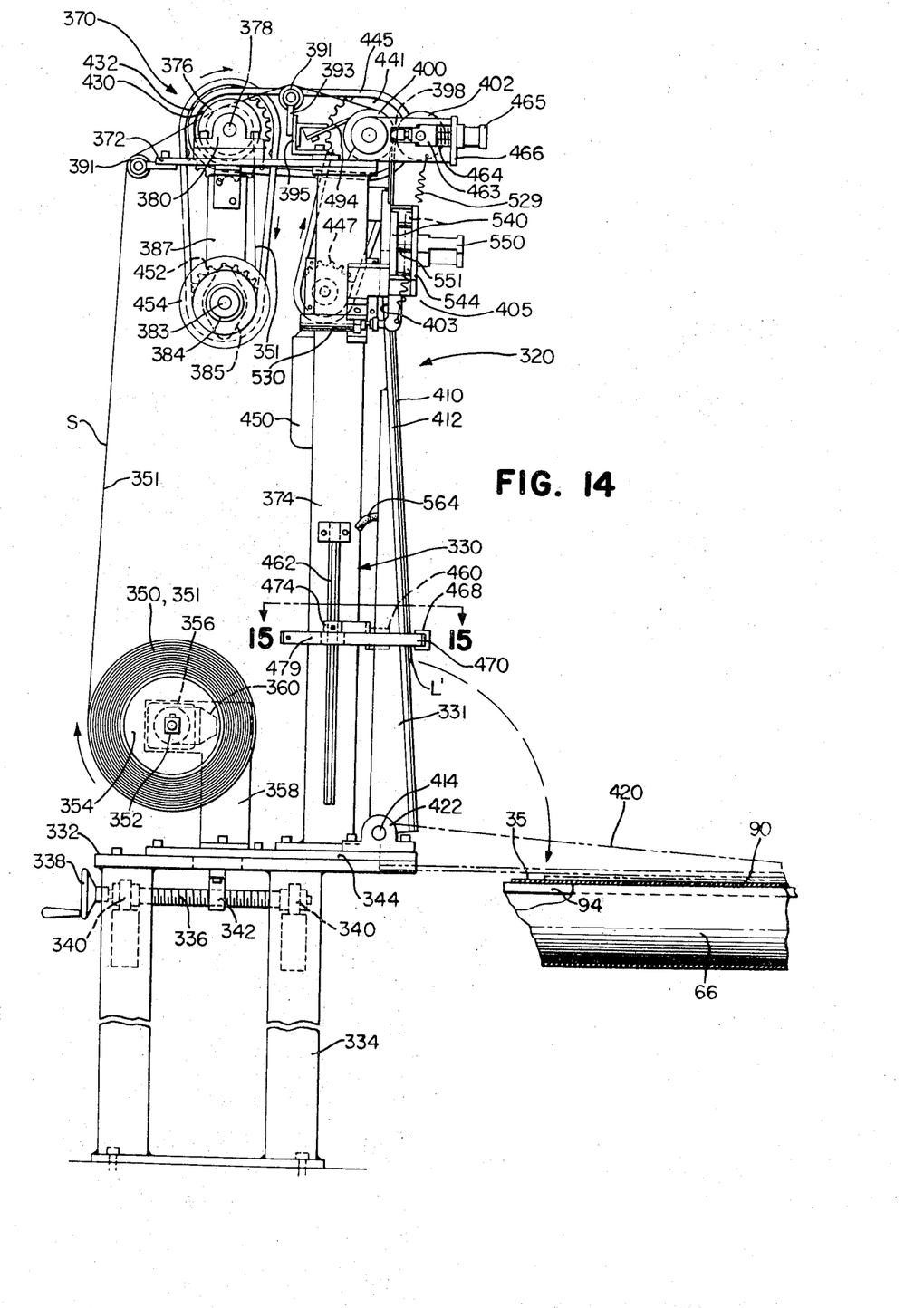

Referring now to FIGS. 13 and 14, the mechanism 320 comprises a tower 330 mounted slidably on the top surface 332 of pedestal 334 fixed on the floor adjacent the slide frame 52. Mounted on the tower is a transfer arm 331 adapted, as will be shown shortly, to transfer a suitably cut length of stock from a vertical orientation outwardly and downwardly to a horizontal position closely parallel to the surface 35 with the longer edges of the cut length and the cords therein at the appropriate angle with respect to the direction 325. The tower is adjustable toward or away from the belt 90 in a direction which makes an angle of 36 degrees with the axis 225 of the mandrel chucks, or 54 degrees with the direction of movement of the belt 325, by a screw 336 having a hand wheel 338 and mounted in suitable bearings 340 fixed in the pedestal. A nut 342 engaging the screw and secured to and extending downwardly from the base plate 334 transmits the rotation of the screw 336 to the plate to make appropriate adjustment in the location of the tower 330.

In order to support a supply roll 350 of cord stock S interwound with a nonextensible separating liner 351, a square or splined spindle 352 or the like adapted to fit a supply roll core 354, is cantileverly supported by suitable bearings 356 mounted on the spindle bracket 358 fixed on the plate 344. The tension of the stock S during unwinding thereof from the supply roll 350 is controlled conventionally by a brake 360 operatively connected to the spindle 352.

To draw the band stock S and the separating linear 351 off from the supply roll 350, a liner wind-off assembly 370 is mounted on a plate 372 fixed at the top of the column 374 to extend outwardly therefrom. A wind-off drive roll 376 having journals 378, 379 is supported in suitable bearings 380 fixed on the plate 372 and a wind-up spindle 383, adapted to receive corotatably a linear core 384 thereon, is cantileverly supported in a pair of bearings 385 fixed on the hanger bracket 387 extending downwardly from the plate 372.

From the drive roll 376 the cord band is trained over a small guide roll 391 mounted rotatably in fixtures 393 secured to a bracket 395 attached to the plate 372 and thence to the nip 398 of a feed roll couple 400, 402 from which the band is led vertically, moved by its own weight, downward between the fixed and the movable blade 401, 403, respectively, of a shearing device 405 and along the surface 410 of a transfer plate 412 forming part of the transfer arm 331, which is mounted for swing movement on and about a pivot shaft 414 between the generally vertical orientation shown in FIG. 14, and a generally horizontal position parallel to and closely adjacent the surface 35 of the belt 90, as indicated by the phantom outline 420 of FIG. 14, swinging in a plane intersecting the axis 225 at an angle of 36 degrees. The pivot shaft 414 is rotatably supported in suitable bearings 422 mounted on the base plate 344 and is connected by a coupling 424 to the drive device 426 which is operable to rotate the arm 331 between the vertical and horizontal positions thereof, as has been described, and which device is a commercial unit known as a Tandem Rota-Cylinder obtainable from Bellows-Valvair Corp., Akron, Ohio.

The drive roll 376 has one of its journals 379 extended outboard of the bearing 380 to carry corotatably the two sprockets 430, 432. A journal extension of the first roll 400 has two sprockets 441, 443 therein on the inner 441 of which is drivingly connected to the inner sprocket 430 of the drive roll 376 by a drive chain 445, the outer sprocket 443 being connected to the driving sprocket 447 on the output shaft of the gear motor 450 which is mounted on the column 374. The outer sprocket 432 is connected to a sprocket 452 corotatable with one hub of a commercial air-actuated clutch 454 through which the liner core spindle 383 is driven, the clutch 454 being regulateable so as to compensate for the build-up of the liner on the liner core in a known manner.

Figure 15:
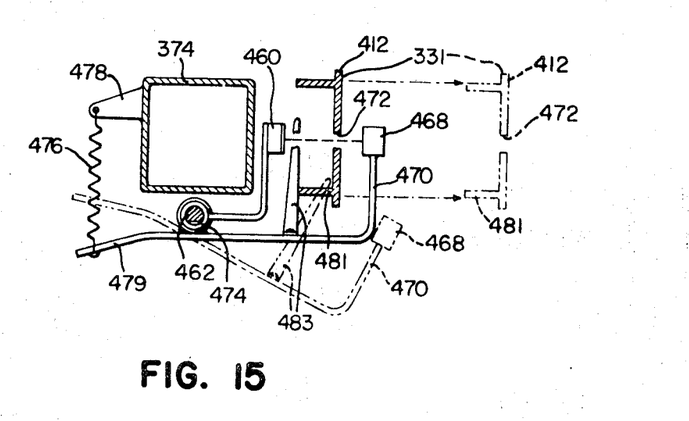
FIG. 15 is a section view taken as indicated by the line 15—15 in FIG. 14.

The outer sprocket 443 on the journal extension of the first nip roll 400 is corotatably coupled to one hub of an identical clutch 458 having an air-actuated element operable to disengage the roll 376 from the gear motor 450 in response to a signal from the photoelectric cell 460, which is adjustably fixed along the rod 462 affixed to the column, to stop rotation of the roll 400 when a predetermined length of cord band has been fed on to the transfer plate 412. The movable roll 402 is mounted for rotation in bearings 463 slidable in the ways 464 formed in the housings 466, fixed on the plate 372, the air cylinders 465 being connected to slide the bearings 463 and the roll 402 toward and away from the roll 400 in response to the aforesaid signal from the photocell 460. The light source 468 for the photocell is carried on an arm 470 (best seen in FIG. 15), and directs a beam of light through the elongated opening 472 in the transfer plate 412 to the photocell 460 which is carried by the slide 474 also mounted on the rod 462. As best seen in FIG. 15, the light source is mounted on the arm 470 which is swingable about the rod 462 to swing the light source 468 outwardly of the path of the transfer arm 331 as the same is swung from its vertical to its horizontal position, the arm 470 being moved outwardly by the tension spring 476 connected between the bracket 478 and the arm extension 479. The light source 468 is restored to its operative location as seen in FIG. 15 as the transfer arm 331 is moved from its horizontal to its vertical position, the web portion 481 of the arm engaging the lever 483 fixed on the arm 470 to move the same by cam action into the position shown.

Because the band of cord material preferred in the practice of the present invention is tacky, the movable roll 402 is provided with a thin covering sleeve of heat-shrinkable polymeric material having good release properties, such as a polytetrafluoroethylene known as Teflon (reg. trademark). The first roll 400 is provided with a plurality of circumferential grooves 490 each of which is occupied by one of the elongate bar sections 492 of a stripper 494, best seen in FIGS. 16 and 17, which partially wraps the roll 400 and extends between ends 496 which are respectively anchored to a seat 498 attached to the bracket 499 and to a plate 500 secured to the face of the column 374. The stripper 494 is formed of a release material, such as a polytetrafluoroethylene known as Teflon (reg. trademark), the radial depth of the grooves 490 and the thickness of the stripper 494 being related such that the cylindrical surface of the stripper presented to the cord band is only slightly below the cylindrical radius of the ridges 504. The width of each groove is filled by the width of the respective bar section 492 therein, while the slots 502 formed in the stripper accommodate the respective circumferential ridges 504 defined by the grooves of the roll 400. The stripper 494, being stationary, prevents the stock from winding about the roll 400 as the latter is rotated to feed the stock through the nip 398.

In order to cut the cord band transversely at the appropriate angle with respect to its length, the shearing device 405 is mounted on the column 374 between the nip 398 and the upper or free end 512 of the transfer plate 412. The fixed blade 401 of the shearing device is secured to the edge 517 of the plate 500 which is fastened by bolts to a block 519 which is rigidly affixed to the face of the column 374. The movable blade 403 of the device 405 is mounted pivotally upon the plate 500 by a pin 522 in the housing 524 having an axial cam 526 effective to move the pivoted end 528 of the blade 403 axially of the pin 522 and progressively away from the fixed blade 401 against the bias of a spring 523 within the housing 524 as the angle between the two blades is reduced. During the shearing action, the contact point between the two blades progresses across the width of the band of cords. The blade 403 is urged toward the blade 401 by a tension spring 529 connected between the housing 466 and the outer end 532 of the blade 403. Movement of the blade 403 about the pin 522 toward and away from the fixed blade 401 is effected by an air cylinder 530 connected between the outer end 532 of the movable blade and the bracket 534 in which the cylinder is mounted on trunnions for pivotal movement accommodating the arcuate travel of the end 532. The bracket 534 is pivotally attached to the plate 500 to facilitate the movement of the blade by the axial cam 526 on the pin.

To resist lateral displacement of the band of cords while the same is being cut by the shearing device 405, a clamp 540 extends transversely of the band of cords parallel to the fixed blade 401 and immediately upstream therefrom in a direction opposite the direction of movement of the stock. The element has guide pins 541 slidable respectively in holes 542 in the bar 544 which is secured to the plate 500 by struts or spacers 546 through which the bar is fixed by bolts to the plate. The bar 544 has a small air cylinder 550 mounted centrally thereon, the piston rod 551 of which passes through the bar and is secured flexibly to the midpoint of the clamp 540.

Figure 16:
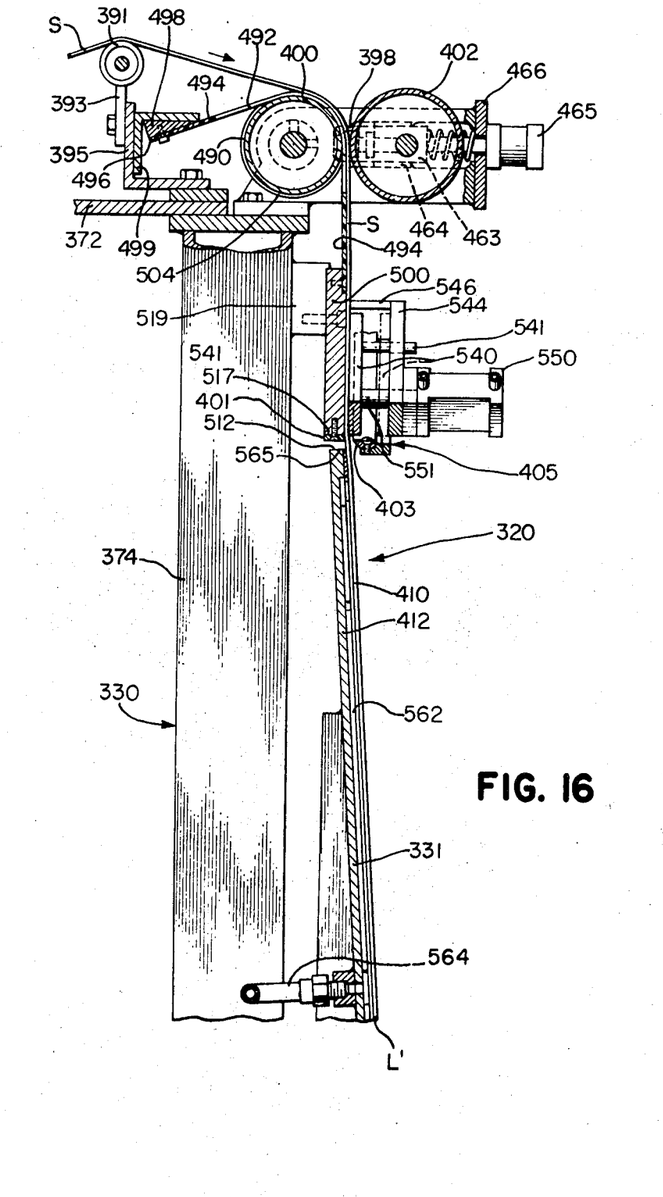
FIG. 16 is a section view taken as indicated by the lines 16—16 in FIG. 13.
Figure 17:
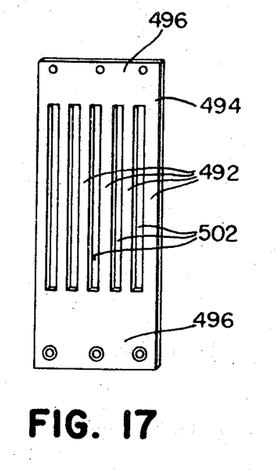
FIG. 17 is a detailed view, enlarged, of an element of the apparatus of FIG. 6.

Referring to FIGS. 13 and 16; the transfer plate 412 has a surface 410 on which the cord band is disposed so that the precut length of band is held securely but releasably thereon during movement of the transfer arm 331 from its vertical to its horizontal position.

The plate 412 is provided with an array of perforations 560 which communicate with a chamber 562 formed within the transfer arm 331. A flexible tube 564 which provides passage means communicating with the chamber 562 is attached to the transfer arm 331 and is selectively opened by suitable valve means (not shown) to a source of air at super-atmospheric pressure and to means for reducing the pressure within the chamber 562 to less than atmospheric so that the cord band is held securely to or released from the surface 510 by differential air pressure. The end 512 of the transfer plate 412 terminates in an edge 565 formed parallel to and closely adjacent the fixed blade 401 with sufficient clearance space therebetween to provide for the relative movement of the plate and the blade 403 with respect to one another.

BELT DRIVE MEANS

Figure 1:
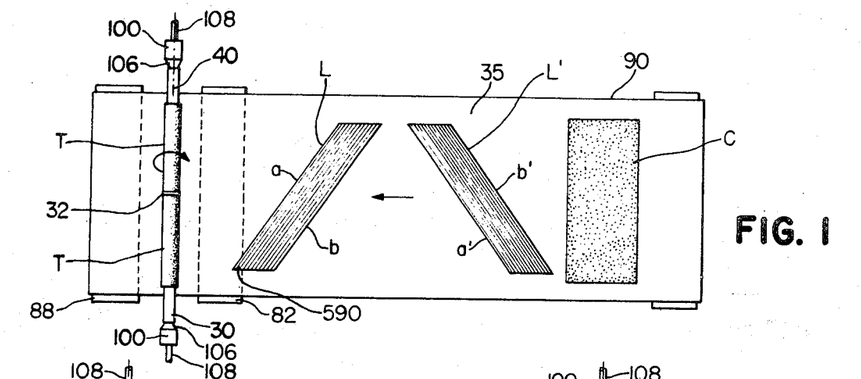
FIGS. 1–5 are schematic diagrams illustrative of the method according to the invention.
Figure 2:
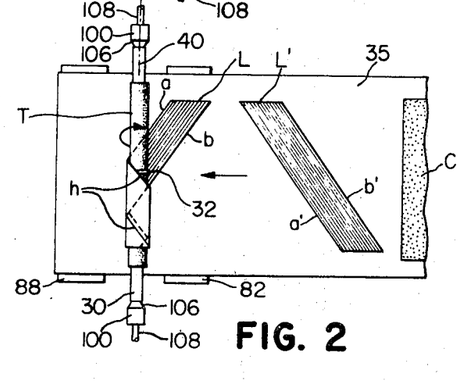
Figure 3:
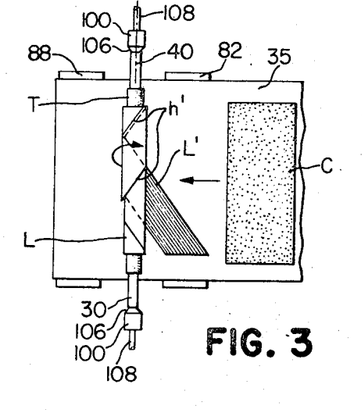
Figure 4:
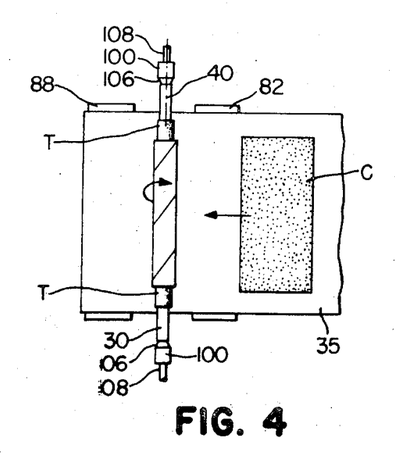
Figure 5:
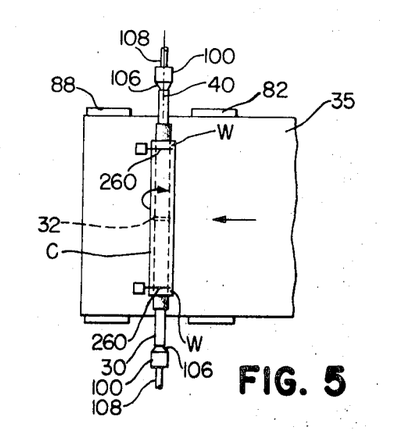

In order to rotate the belt 90 forward through a fixed distance of travel, drive means are connected to the belt drive roll 66. In the specific apparatus 50 the drive means is provided by a pneumatic indexing drive 575 available commercially as a Rotary-Actuator B471-016, obtainable from Bellows-Valvair Corp., Akron, Ohio. A Formsprag (reg. trademark) clutch 577, or an equivalent thereof, has its internal hub secured corotatably with the output shaft 579 of the indexing drive and its external hub secured corotatably to the sprocket 581 which is connected by a conventional transmission chain to the sprocket 74 of the drive roll. The clutch 577 transmits rotation only in one direction, anticlockwise, as seen in FIG. 2. Each actuation of the indexing drive 575 drives the belt forward through a fixed distance: to rotate the mandrel 30 held between the chucks 100; to wrap the successive cord bands snugly thereabout; to wrap the gum liner C snugly circumferentially about the cord bands; and to continue the rotation of the mandrel 30 with the sleeve assembled thereon for at least two complete revolutions during which the trimming knives 260 cut a small annulus from each respective end of the sleeve and serve to seal the liner to the underlying tubes T, thus protecting the cord endings therebetween from the surrounding atmosphere.

OPERATION

Operation of the apparatus disclosed will have become generally apparent from the preceding description. Inasmuch as the apparatus 50 is operable continuously to lay up a succession of sleeves, each on its respective mandrel 30, a description of a single cycle of operation will suffice to make clear the general operation of the apparatus.

A supply of cord band stock previously wound on a suitable core 354 together with an interwound separating liner 351 of cloth or film, such as polyethylene, is mounted on and secured to the spindle 352. The leading end of the liner and of the cord band are passed together over an idler roll 391 fixed on the plate 372 and thence over the drive roll 376. The separating liner 351 is passed downwardly from the roll 376 and secured to the liner wind-up core 384 on the spindle 383. The band alone is threaded from the drive roll 376 over the second idler roll 391 and through the nip 398 of the roll couple 400, 402 downwardly across the surface of the plate 500 a sufficient distance through the shearing device 405 to permit the same to cut off an end of the stock to provide a fresh edge at the appropriate angle and a "zero" length from which the desired length of band will be measured. The gear motor 450 is then energized, preferably to run continuously, and the clutch 458 and the feed roll nip closing cylinders 465 are respectively engaged and actuated to close the nip 398 and to move the stock downward along the surface 410 of the plate 412 of the transfer arm 331 until the cut edge interrupts the light beam to the photocell 460 whereupon the clutch 458 is disengaged and the nip 398 opened. The chamber 562 within the transfer arm 331 is thereupon connected to a partial vacuum, the clamp cylinder 550 is actuated to press the clamp 540 toward the plate 500 and the cylinder 530 is actuated to cut off the appropriate length of the band. An identical sequence is performed in and by the mechanism 320'.

One or more mandrels 30 having tubular sleeves T placed thereon, as has been described, snugly abutting the ring 32 are placed on the respective pockets 128 of the conveyor loops 124. The indexing device 200 is actuated a sufficient number of times to move a first mandrel into the star-wheel transfer device 140 and thence across the apron 130 on to the incline 92 of the belt 90 which is placed in its upper position by operation of the belt swing arms 84. The mandrel stop roll 220 in its down position as seen in FIG. 7 cooperates with the belt 90 to locate the mandrel 30 coaxially with the chucks 100 which are then extended to support the mandrel 30 in its operating association with the belt 90 and the roll 220 is retracted, allowing the belt to wrap a small arcuate portion of the tubes on the mandrel.

The transfer arms 331 of the respective mechanisms 320 and 320' each having thereon a precut length of cord mand, are swung downwardly into horizontal positions parallel to and immediately above the surface 35 of the belt 90, the subatmospheric pressure within the chamber 562 operating to hold the band securely to the surface 410. When the respective transfer arms 331 have reached their down positions immediately adjacent the belt 90, air at super-atmospheric pressure is admitted to the chamber 562 for a period sufficient to cause a pulse of air pressure positively to release the tacky band material from the surface 410 permitting the band to drop a very small distance to its proper position on the belt 90 with the cords and longitudinal edges of the band lying in a plane tangent to the surface of the tubes T and at respectively appropriate angles with the axis 225.

To provide a liner for the sleeve, which as previously mentioned, will be everted or turned inside out, the previously prepared sheet C of uncured curable material of rectangular shape and suitable thickness is placed on the belt 90 with its longer sides parallel to the axis 225, and with its shorter sides at a nominal distance otuboard of the respective short sides of the cord bands previously discussed.

The belt drive 575 is thereupon energized to advance the belt 90 and effect rotation of the mandrel 30. As will be apparent from inspection of FIG. 6, a leading corner 590 of the first cord band L enters the nip formed between the mandrel 30 and the belt 90 so that the tension in the belt augments the preferential adhesion between the tube T and the cord band L sufficiently to adhere the corner 590 to the tube T and wrap the same completely therearound as the belt continues forward movement. The width of each band is so related to the circumference of the tube T on the mandrel that the edge $b$ of the first band closely abut or slightly overlaps the edge $a$ forming a splice or seam helically about the full length of the sleeve. Continued forward movement of the belt 90 without interruption winds the second cord band L' about the mandrel 30 in the same manner but with the cords thereof and the abutment or overlap of the respective edges $a'$ and $b'$ of the band L' forming a helix of opposite hand about the mandrel 30.

Continuing forward movement of the belt 90 also winds the cover liner C circumferentially about the cord bands L, L' so as completely to encase the same within the uncured curable rubbery material.

During that part of the forward movement of the belt which effects the rotation of the mandrel 30 after the liner C has been wound completely thereon, the knives 260 are swung toward the mandrel 30 to cut a small discardable ring outwardly of the ends of the cord bands L, L' and to seal the covering liner C to each tube T on the mandrel 30.

It will be noted upon inspecton of FIG. 7, that the belt span or reach extending between the drive roll 66 and the take up roll 88 while the latter is in its upper position is effectively supported only by its own tension with the desirable result that the nip formed between the mandrel and the belt is relatively soft. This feature enables the bands L, L' to be wound from the belt two or more turns about the tubes T and progressively along their axial length without distortion as might be expected to occur. With a relatively hard nip, such as between two rolls, the change in pressure relation therebetween as the thickness of the band enters the nip at an angle therewith can usually be expected to distort such band.

As the belt 90 reaches the end of its forward movement, the knives 260 are retracted into their respective heating elements 297 and the roll 220 is moved downward while the chucks 100 are retracted out of engagement with the ends of the mandrel 30. The swing arms 84 are then lowered into their lower position to allow the mandrel 30 and the sleeve thereon to roll along the downward slope of the belt and along the swing arms 84 to drop into the receiving tray 610. The receiving tray is advantageously covered, with a pile material or carpet, for which use sheepskin has been found satisfactory, to protect the surface of the uncured sleeve while the same is in contact with the receiving tray.

The mandrels with the completed sleeves thereon are removed from the tray 610 to curing means, not within the scope of the present invention, in which the same are cured while yet in place on the mandrel.

Following the cure of the sleeves, the same are cut in half at the circumferentially reduced wall thickness effected in the sleeve by the ring 32 on the mandrel and are then reversed or turned inside out for use, as has been described.

While certain representative embodiments and details have been shown for the purpose of illustrating the invention, it will be apparent to those skilled in the art that various changes and modifications may be made therein without departing from the spirit or scope of the invention.

What is claimed is:

1. Method of fabricating a cord reinforced eversible sleeve comprising mounting a tube of uncured curable rubbery material on a rigid cylindrical mandrel, placing a band of cord material upon a carrier with the cords of said band oriented parallel to a line which makes an acute angle with the longitudinal axis of said mandrel, then engaging the respective faces of the band on said carrier and of the tube on said mandrel while rotating said mandrel to wind said band helically about the mandrel a plurality of revolutions to place the respectively opposite edges of said band in mutually adhesive contact with each other along a helix coaxial with the tube on said mandrel, and subsequently curing such sleeve prior to stripping the same from said mandrel.

2. The method as claimed in claim 1, including forming a plurality of such tubes for said mounting by extruding a seamless tubular body of indefinite running length and cutting said body transversely at predetermined intervals.

3. The method as claimed in claim 2, effecting said mounting by expanding each said tube elastically while moving the same coaxially onto said mandrel.

4. The method as claimed in claim 3, the mounting of said tube including moving one of said tubes in a first direction axially of the mandrel to abut an annular rigid ring fixed on said mandrel and a second such tube in a second direction opposite said first direction to abut said ring.

5. The method as claimed in claim 2, including placing a second band of said cord material upon said carrier with the cords of said second band oriented at a second acute angle opposite and substantially equal to the first said angle.

6. The method as claimed in claim 5, wherein said second band is so disposed on said carrier as to be wound on said tube during rotation of said mandrel subsequently to the winding of the first said band thereon and with the respective edges of said second band in mutually adhesive contact with each other along a second helix opposite in hand to the first said helix.

7. The method as claimed in claim 1 including cutting off said band from a running length of said cord material such that the respective ends of said band and of the cords thereof terminate in parallel spaced apart planes perpendicular to said mandrel, each of said planes being spaced axially inwardly of the respectively proximate end of said tube.

References Cited
UNITED STATES PATENTS

| | | | |
|---|---|---|---|
| 3,013,920 | 12/1961 | Harris et al. | 267—15 A X |
| 2,984,262 | 5/1961 | Aymami et al. | 156—188 X |
| 3,455,758 | 7/1969 | Straughan | 156—215 |
| 2,996,103 | 8/1961 | Hollis et al. | 267—65 B |

ALFRED L. LEAVITT, Primary Examiner

D. A. SIMMONS, Assistant Examiner

U.S. Cl. X.R.

156—188, 190, 215, 218, 250 446; 267—65 B